Figure 1:
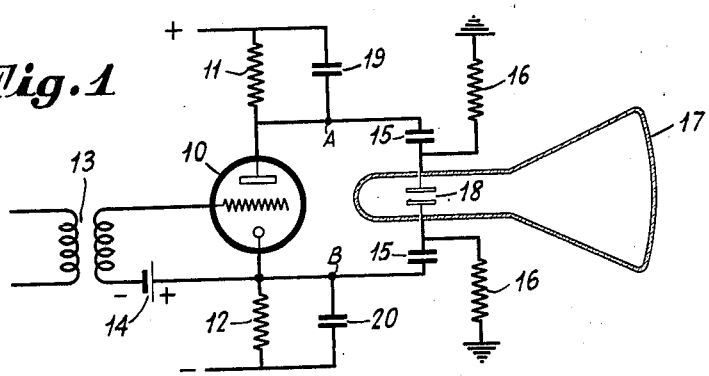

Aug. 31, 1943.    R. ANDRIEU    2,328,248

SAWTOOTH WAVE GENERATOR

Filed Feb. 27, 1937

INVENTOR
ROBERT ANDRIEU
BY
ATTORNEY

Patented Aug. 31, 1943

2,328,248

UNITED STATES PATENT OFFICE 2,328,248

SAW-TOOTH WAVE GENERATOR

Robert Andrieu, Berlin, Germany; vested in the Alien Property Custodian

Application February 27, 1937, Serial No. 128,089
In Germany February 28, 1936

9 Claims. (Cl. 250—36)

My invention relates broadly to oscillator generators, and more particularly to a sawtooth wave generator especially of that type which is particularly adaptable for use with cathode ray tubes used for television purposes.

The present application is related to a previous application, Serial No. 124,977, filed February 10, 1937, and in the previous application there was disclosed a sawtooth wave generator comprising in general a condenser joined through two resistances of like value to the poles of a D. C. source of voltage while in parallel relationship to the condenser is the plate cathode circuit of a controlled discharge tube, preferably the high vacuum type. That arrangement operated in the following manner:

As long as the electron discharge tube is blocked, the upper or the lower plate of the condenser approached the potential of the positive or negative pole of the D. C. voltage source. The condenser and the two resistances form a time constant circuit and the charge of the condenser accordingly is a linear function as regards time. At a definite and desired interval, the plate cathode circuit of the controlled discharge tube was rendered conductive and the condenser discharged therethrough.

This previously explained method, however, was subject to the disadvantage that the grid circuit of the controlled discharge tube must be negatively biased, and in television apparatus this is particularly disadvantageous since in television receivers only one power pack furnishing current from a supply line is usually available. The output end of this power pack must be grounded at some suitable point and the result is the negative biased voltage for the control grid may not be derived from the power pack since the negative source may not be kept at a potential which is at a fixed value with reference to ground, and with respect to ground the grid experiences the same potential fluctuations as the filament of the tube. For this reason it would be necessary in order to bias the control grid circuit of the tube to furnish a distinct small sized power pack in which the secondary winding of the transformer and rectifier as well as condensers involved would have to be insulated from the primary winding of the transformer in the pack so that the D. C. voltage source could respond to and follow the potential variations of the filament of the tube.

In general, in order to avoid the use of such a separate power pack the grid bias is furnished by means of a condenser and grid leak arrangement which suitably biases the grid by means of the grid current.

My co-pending application hereinbefore referred to disclosed a circuit organization adapted to generate a symmetric sawtooth potential of the kind required for the deflection of the cathode ray pencil in oscillographs and television tubes. Such a circuit scheme requires a D. C. voltage which must be operable throughout the whole duration of the feebly sloped sawtooth flank or side.

In general, according to the present invention the circuit is arranged in such fashion that merely during the brief and steep sawtooth side or flank a D. C. voltage is required which may be supplied in a simpler way than a D. C. voltage operative during the generation of the other longer side of the sawtooth. There could be employed, for instance, a choke-coil traversed by a relatively large current, the coil being disconnected for a brief period of time with the result that a high potential builds up across its terminals. The grid-controlled tube shown in the disclosure of the application hereinbefore referred to is connected by way of two resistances of equal size with the positive and the negative pole of a D. C. source of supply as also described in the earlier disclosure. However, to each of the said two resistances is connected in parallel a condenser, and these two condensers also are of like size.

Figure 2:
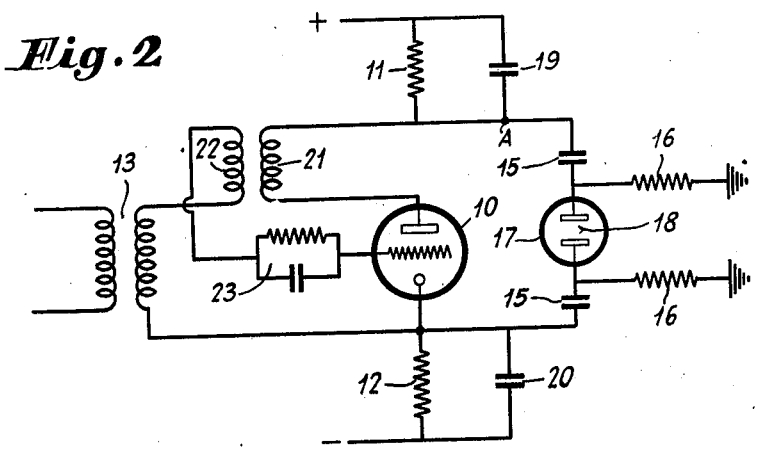
Figure 3:
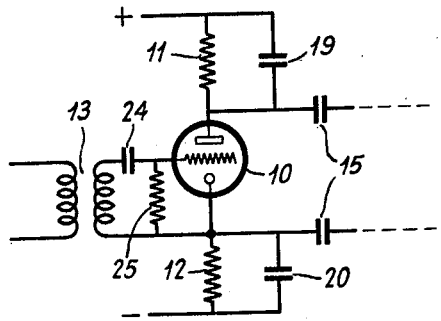

My invention will best be understood by reference to the accompanying drawing, in which Fig. 1 is one embodiment of my invention, Fig. 2 is another embodiment of my invention, and Fig. 3 is a still further embodiment of my invention.

Referring to Fig. 1, there is shown therein one embodiment of my invention. A grid control vacuum tube 10 containing anode, cathode and control electrodes has a resistor 11 joined in series with the anode and the positive side on the plate supply potential (not shown). A similar resistance 12 is connected in series with the negative side of the plate supply potential and the cathode of the tube 10. The control electrode of the tube 10 may be energized by incoming synchronizing pulses, for instance, by means of transformer 13 whose secondary is joined to the control grid and through the grid biasing battery 14 back to the cathode. The resistors 11 and 12 which are substantially of equal value are then joined through coupling condensers 15 to ground by way of resistor 16. A cathode ray tube 17 is illustrated whose deflecting plates 18 are joined to the terminal points of the connection between the coupling condensers 15 and resistor 16. Two condensers 19 and 20, which are substantially of equal value, are connected in parallel with resistors 11 and 12 respectively.

The scheme Fig. 1 operates in the following manner. For the generation of the brief and steeply rising flank of the sawtooth the discharge tube 10 is rendered conducting by means of the transformer 13. The internal resistance of the said tube shall be assumed to be very low, and this condition may be assured in practice, for instance, if the tube 10 is a "Thyratron." The condensers 19 and 20 are then charged up to the potential of the source of D. C. voltage indicated by the plus and minus signs, in such a way that one-half the D. C. voltage prevails at each of the said two condensers. The two points marked A and B, as will thus be noted, are at the same potential after the condensers have been charged. Next the flow of current through the tube is blocked, and the two condensers 19 and 20 are discharged through the corresponding resistances 11 and 12, respectively, this discharge occurring at a rate which is governed by the time constant of circuit 19, 11, and 20, 12, respectively, the potential of point A rising in the positive sense, and the potential of point B in the negative sense. As soon as the tube 13 becomes conductive again, the condensers 19 and 20 become charged up again in the same way as hereinbefore described. In other words, at points or terminals A and B opposite voltage variations will arise so that by the deflector plates 18 the cathode ray pencil is deflected out of its one limiting position (maximum deflection or excursion of cathode ray pencil in one direction), through zero (where the pencil axis coincides with the axis of the tube) into the other limiting position (maximum excursion of cathode ray pencil in the opposite direction). The mean D. C. voltage across points A and B is impressed on the coupling condensers 15.

In the embodiment of my invention shown in Fig. 1 the tube 10 requires a negative grid biasing source 14, and this negative biasing potential supply undergoes the same potential fluctuations as point B. In other words, it may be impracticable at times to derive the grid biasing voltage from the power pack provided in receiver apparatus. Since it would be necessary to furnish the transformer of the power pack with a distant secondary winding, and to provide a special small-sized rectifier as well as smoothing condenser with a view to obtaining the grid bias voltage.

This inconvenience is obviated in the embodiments illustrated in Figs. 2 and 3.

Another embodiment of my invention is shown in the arrangement illustrated by Fig. 2. As in Fig. 1, the vacuum tube 10 containing anode, cathode and control electrodes has electrically connected in series with the anode resistors 11 and 12, the former being between the anode and the positive side of the plate potential supply (not shown), and the latter being between the negative side of the plate supply potential and the cathode of the tube. Again, synchronizing impulses may be impressed on to the control electrode of tube 10 by way of transformer 13, the secondary of which is connected in series with the grid and the cathode. The variations in potential across resistors 11 and 12 are passed on to the deflecting plates of the cathode ray tube and are grounded through resistors 16, the deflecting plates of the cathode ray tube 17 being again identified as 18, and are joined to the terminal point of the connection between coupling condensers 15 and resistances 16. As in Fig. 1, two condensers 19 and 20 each are joined across one of each of the resistors 11 and 12 respectively. Also in series with the anode of tube 10 is joined an inductive member 21 which may be close coupled to a second inductive member 22, the latter being connected in series with the control grid of the tube 10, the secondary of transformer 13, the cathode of the tube and the time constant circuit 23. As soon as a positive impulse is impressed on the grid by means of transformer 13, the blocking oscillator set out herein sets up a very intense current rush in the plate circuit, while the condenser of the time constant circuit 23 in the control grid of tube 10 is charged to a very high negative potential which gradually leaks away through the resistance. The time constant of circuit 23 is proportioned so that tube 10 is made conducting upon the impressing of a new impulse on the control grid through the transformer 13. The remainder of the circuit works in the same fashion as that set out as regards Fig. 1.

Fig. 3 shows another modification of my invention wherein like numerals refer to the same arrangement as disclosed in Fig. 1. However, in the arrangement of Fig. 3, a condenser grid-leak combination 24 and 25 respectively is connected in the grid circuit of the vacuum tube 10. As in the case of Fig. 2, the condenser 24 is charged by grid current when a high positive pulse is applied to the grid of the tube, and this grid current gradually leaks off through resistor 25. The remainder of the circuit operates in the same fashion as illustrated in Fig. 1.

What I claim:

1. A sawtooth wave generator comprising a plurality of condensers, a resistive member connected substantially in parallel with each of said condensers, a thermionic vacuum tube having at least an anode and a cathode, means for maintaining said tube normally impervious to current flow during the charging of said condensers a source of electrical energy, one of said resistance-condenser combinations having one terminal thereof connected to the positive terminal of the energy supply and the other terminal thereof connected to the anode of said tube, and another of said resistance-condenser combinations having one terminal thereof connected to the negative side of said source of energy and the other terminal thereof connected to the cathode of said thermionic tube.

2. Apparatus in accordance with claim 1, wherein said thermionic tube comprises a triode, an wherein there is provided in addition means for impressing signals from an external source onto the control electrode-cathode circuit thereof.

3. A sawtooth wave generator comprising a pair of independent electrical storage elements, a resistive member connected substantially in parallel with each of said storage elements, a thermionic vacuum tube having anode, cathode and at least one control electrode, means for maintaining said tube normally impervious to current flow during the charging of said storage elements, a source of direct current energy for energizing the anode-cathode circuit of said tube, one of said resistance-condenser combinations having one terminal thereof connected to the positive side of the source of direct current, and the other terminal thereof electrically connected to the anode of the tube, and the other of said resistance-condenser combinations having one terminal thereof connected to the cathode of the tube and the other terminal thereof electrically connected to the negative side of said direct current source, and a time constant circuit connected in the control electrode-cathode circuit of said tube, said time constant circuit comprising the means for maintaining the said tube normally impervious to current flow during the charging of said condensers.

4. Apparatus in accordance with claim 3 wherein there is provided, in addition, means for impressing signals from an external source on to the control electrode-cathode path of said thermionic tube.

5. Apparatus in accordance with claim 3 wherein there is provided, in addition, means for feeding back a portion of the energy in the anode-cathode path of said tube to the control electrode-cathode path of said tube.

6. A sawtooth wave generator comprising a plurality of independent electric storage means, impedance means connected in parallel with each of said electric storage means, a thermionic vacuum tube having anode, cathode and at least one control electrode, means for maintaining said tube normally impervious to current flow during the charging of said storage means, said electric storage means with said shunt impedance means being serially connected in the anode cathode path of said thermionic tube, a source of electrical energy serially connected with said electric storage means and said impedance means and connected therebetween, means for impressing signals from an external source onto the control electrode-cathode path of said thermionic tube, condenser means connected serially with said latter means in the control electrode-cathode circuit of said tube and resistance means shunted across said condenser means and said means for impressing signals from an external source onto the control electrode-cathode path of the tube, said latter condenser means and said resistance means comprising the means for maintaining said tube normally impervious to current flow during the charging of said storage means.

7. Device for the production of relaxation oscillations, comprising a discharge tube, at least a cathode, an anode and a control electrode in said discharge tube, means for impressing impulses of voltage to said control electrode, two terminals to be connected to a feeding source, a first circuit comprising a resistance and connected between one of said terminals and the anode of said discharge tube, and a second circuit identical to said first circuit connected between the other terminal and the cathode of said discharge tube, whereby the time variations of the voltage of the said cathode and of the said anode are symmetrical with respect to the mean feeding voltage.

8. Device for the production of relaxation oscillations, comprising a discharge tube, at least a cathode, an anode and a control electrode in said discharge tube, means for impressing impulses of voltage to said control electrode, two terminals to be connected to a feeding source, a first circuit connected between one of said terminals and the anode of said discharge tube, a condenser and a resistance in said first circuit, and a second circuit identical to said first circuit connected between the other terminal and the cathode of said discharge tube, whereby the time variations of the voltage of the said cathode and of the said anode, due to the charges and discharges of the condensers in said circuits, are symmetrical with respect to the mean feeding voltage.

9. Device for the production of relaxation oscillations, comprising a discharge tube, at least a cathode, an anode and a control electrode in said discharge tube, means for impressing impulses of voltage to said control electrode, two terminals to be connected to a feeding source, a first circuit connected between the positive one of said terminals and the anode of said discharge tube, a resistance in said first circuit, a second circuit identical to said first circuit connected between the negative terminal and the said cathode, a first condenser connected between the anode of the discharge tube and the negative terminal, and a second condenser connected between the cathode of the discharge tube and the positive terminal, whereby the time variations of the voltage of the said cathode and of the said anode, due to the charges and discharges of the said condensers, are symmetrical with respect to the mean feeding voltage.

ROBERT ANDRIEU.